US012759692B2

(12) United States Patent
Williams et al.

(10) Patent No.: US 12,759,692 B2
(45) Date of Patent: Oct. 13, 2026

(54) SYSTEM AND METHOD FOR SUPPORTING A LEADING EDGE OF A WING OF AN AIRCRAFT

(71) Applicant: THE BOEING COMPANY, Arlington, VA (US)

(72) Inventors: Zachary Clayton Williams, St. Louis, MO (US); Greg Andrew Pillar, Chesterfield, MO (US); Greg J. Goodman, Chesterfield, MO (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/989,374

(22) Filed: Dec. 20, 2024

(65) Prior Publication Data

US 2026/0175963 A1 Jun. 25, 2026

(51) Int. Cl.
*B64C 3/28* (2006.01)
*B64F 5/40* (2017.01)

(52) U.S. Cl.
CPC . *B64C 3/28* (2013.01); *B64F 5/40* (2017.01)

(58) Field of Classification Search
CPC ........................................................ B64C 3/28
See application file for complete search history.

(56) References Cited

U.S. PATENT DOCUMENTS 3,026,067 A * 3/1962 Grant ........................ B64C 9/22 244/91
3,128,966 A * 4/1964 Alvarez-Calderon ........................ B64C 21/02 244/210
3,374,972 A * 3/1968 Webb, Sr. ............. B64C 1/1415 49/362
3,653,615 A * 4/1972 Spence ................. B64C 1/1415 244/102 R
5,927,656 A * 7/1999 Hinkleman ............... B64C 9/24 244/76 A
6,834,830 B2 * 12/2004 Fujino ....................... B64C 3/28 244/35 R
8,070,100 B2 * 12/2011 Douglas .................... B64C 3/28 244/123.1
8,292,235 B2 * 10/2012 Wollaston ................. B64C 9/24 244/210
8,459,592 B2 * 6/2013 Pahl ...................... B64C 1/1415 244/129.4
9,180,962 B2 * 11/2015 Moser ....................... B64C 9/06
(Continued)

FOREIGN PATENT DOCUMENTS

EP 4089008 A1 * 11/2022 ............... B64C 3/26
FR 2783495 A1 * 3/2000 ........... B64C 1/1415

*Primary Examiner* — Joseph W Sanderson
(74) *Attorney, Agent, or Firm* — Joseph M. Butscher; Carroll, Hoette & Butscher, LLC

(57) ABSTRACT

A support system is configured to couple a leading edge of a wing to a main body of the wing. The support system includes an extender configured to secure to the leading edge and the main body. The extender is configured to extend and retract. The support system is in a retracted position when the extender is retracted. The support system is in a forward extended position when the extender is extended. The leading edge abuts the main body when the support system is in the retracted position. The leading edge is spaced apart from the main body when the support system is in the forward extended position.

20 Claims, 5 Drawing Sheets

(56) References Cited

U.S. PATENT DOCUMENTS

| | | | | |
|---|---|---|---|---|
| 9,359,063 | B2 * | 6/2016 | Pisacreta | F02C 7/06 |
| 10,730,605 | B2 * | 8/2020 | Salisbury | B64C 3/26 |
| 10,752,337 | B2 * | 8/2020 | Corrao | B64F 5/10 |
| 11,192,624 | B2 * | 12/2021 | Schlipf | B64C 3/26 |
| 11,242,129 | B2 * | 2/2022 | Schlipf | B64C 3/185 |
| 11,267,553 | B2 * | 3/2022 | McNaught | B64C 3/26 |
| 11,370,525 | B2 * | 6/2022 | Bishop | B64C 3/187 |
| 12,065,244 | B2 * | 8/2024 | Bensmann | B64C 9/22 |
| 12,479,569 | B2 * | 11/2025 | Kelly | B64C 9/22 |
| 2003/0230670 | A1 * | 12/2003 | Fujino | B64C 3/28<br>244/35 R |
| 2010/0065687 | A1 * | 3/2010 | Douglas | B64C 3/28<br>244/130 |
| 2010/0116944 | A1 * | 5/2010 | Wollaston | B64C 9/24<br>244/214 |
| 2010/0252682 | A1 * | 10/2010 | Pahl | B64C 1/1415<br>244/129.5 |
| 2014/0166835 | A1 * | 6/2014 | Pisacreta | B64C 9/22<br>248/298.1 |
| 2015/0083867 | A1 * | 3/2015 | Moser | B64C 13/506<br>244/214 |
| 2017/0327245 | A1 * | 11/2017 | Salisbury | B64C 3/26 |
| 2019/0002079 | A1 * | 1/2019 | Schlipf | B64C 3/187 |
| 2019/0002080 | A1 * | 1/2019 | Schlipf | B64C 3/187 |
| 2019/0061907 | A1 * | 2/2019 | Corrao | B64C 30/00 |
| 2019/0176960 | A1 * | 6/2019 | Mcnaught | B64F 5/10 |
| 2020/0140059 | A1 * | 5/2020 | Bishop | B64F 5/10 |
| 2023/0002031 | A1 * | 1/2023 | Bensmann | B64C 9/02 |
| 2024/0174351 | A1 * | 5/2024 | Kelly | B64C 9/02 |
| 2024/0417065 | A1 * | 12/2024 | Kirk | B64C 9/12 |
| 2025/0136269 | A1 * | 5/2025 | Northedge | B64C 3/28 |

* cited by examiner

SYSTEM AND METHOD FOR SUPPORTING A LEADING EDGE OF A WING OF AN AIRCRAFT

FIELD OF THE DISCLOSURE

Examples of the present disclosure generally relate to a system and a method for supporting a leading edge of a wing of an aircraft, such as during a maintenance operation.

BACKGROUND OF THE DISCLOSURE

Various aircraft include components located in particular areas, which may need to be accessed during maintenance operations. In both commercial and military aircraft, the component(s) may be located in a leading edge or main body of a wing.

During a maintenance operation for a component within a leading edge or main body, the aircraft is typically moved to a hangar bay, and support equipment is used to completely remove the leading edge from the remainder of the wing. The support equipment can include a crane that is used to hold the leading edge during the maintenance operation.

As can be appreciated, the process of removing the leading edge, and using additional equipment to retain the leading edge during a maintenance operation is time and labor intensive.

SUMMARY OF THE DISCLOSURE

A need exists for an efficient and effective system and method for supporting a leading edge of a wing of an aircraft during a maintenance operation.

With that need in mind, certain examples of the present disclosure provide a support system configured to couple a leading edge of a wing to a main body of the wing. The support system includes an extender configured to secure to the leading edge and the main body. The extender is configured to extend and retract. The support system is in a retracted position when the extender is retracted. The support system is in a forward extended position when the extender is extended. The leading edge abuts the main body when the support system is in the retracted position. The leading edge is spaced apart from the main body when the support system is in the forward extended position.

In at least one example, the extender includes a pivot member configured to move the support system into an upward pivoted position. The support system in the upward pivoted position pivotally supports the leading edge in relation to the main body.

The support system can also include a strut configured to support the leading edge when the support system is in the upward pivoted position. The strut can be moveably coupled to one or both of the leading edge or the main body.

Fasteners securely fix the leading edge to the main body. The fasteners prevent the support system from moving from the retracted position to the forward extended position. The fasteners are configured to be removed to allow the support system to be moved from the retracted position to the forward extended position.

In at least one example, the extender is configured to be secured within the main body and the leading edge when the support system is in the retracted position.

As an example, the extender includes a fixed rail configured to be secured to the main body, and an extension rail slidably secured to the fixed rail. The extension rail is configured to be secured to the leading edge. As another example, the extender includes telescoping segments.

Certain examples of the present disclosure provide an aircraft including a wing having a leading edge and a main body, and a support system coupling the leading edge to the main body, as described herein.

Certain examples of the present disclosure provide a method including retracting the extender to move the support system into the retracted position so that the leading edge abuts the main body, and extending the extender to move the support system into the forward extended position so that the leading edge is spaced apart from the main body.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present provide a system and a method for replacing, maintaining, or servicing component(s) disposed within and/or behind a leading edge of a wing or other flight surface. During a maintenance operation, the system and method retain the leading edge on a main body of the wing (in contrast to completely removing the leading edge from the main body). The system and method include one or more extenders. As an example, the extender(s) include a beam moveably coupled to a rail. The beam is configured to move outwardly from the rail to allow the leading edge to forwardly extend away from the main body. The system can also include a pivot member that allows the leading edge to be upwardly (or downwardly) pivoted, thereby providing easy access to internal areas of the leading edge and the main body. The system can also include one or more struts that brace the leading edge in a particular position. In at least one example, the system does not carry flight loads. Instead, flight loads travel through typical hardware attachments coupled to one or more spars, stringers, and/or ribs of the wing.

Figure 1:
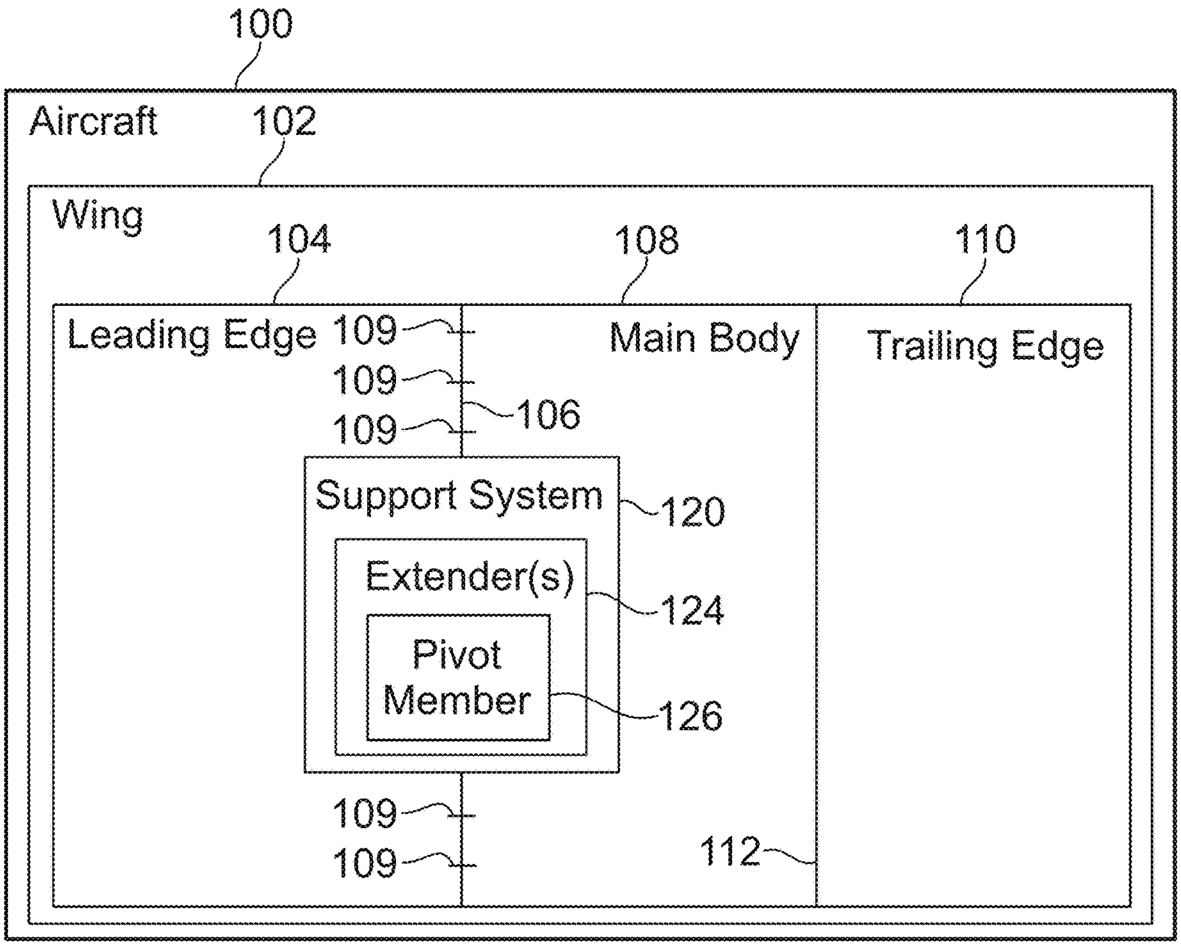
FIG. 1 illustrates a block diagram of an aircraft, according to an example of the present disclosure.

FIG. 1 illustrates a block diagram of an aircraft 100, according to an example of the present disclosure. The aircraft 100 includes one or more wings 102, each of which includes a leading edge 104 (which includes one or more control surfaces, such as flaps, ailerons, and/or the like) secured to a front end 106 of a main body 108, and a trailing edge 110 secured to a rear end 112 of the main body 108. In at least one example, the main body 108 includes a fixed torque box. In at least one example, the leading edge 104, the main body 108, and the trailing edge 110 include spars, ribs, and stringers covered by outer skin.

The leading edge 104 is fixed to the main body 108 through fasteners 109, such as bolts. The leading edge 104 is secured to the fasteners 109 through numerous fasteners 109, such as hundreds of bolts.

A support system 120 is coupled to the main body 108 and the leading edge 104. In at least one example, the support system 120 is secured within internal portions of the main body 108 and the leading edge 104. That is, the support system 120 may not be secured to outer surfaces of the main body 108 or the leading edge 104. The support system 120 includes one or more extenders 124. In at least one example, the extender(s) 124 is secured to one or more spars, ribs, and/or stringers of the main body 108 and the leading edge 104. The extender(s) 124 includes a pivot member 126, such as at a forward end. Alternatively, the extender(s) 124 may not include a pivot member.

In at least one example, the support system 120 includes one extender 124. As another example, the support system 120 includes multiple extenders 124 disposed along a length of the wing 102. For example, the support system 120 can include two, three, four, or more extenders 124.

As an example, the extender(s) 124 include a beam slidably coupled to a rail. As another example, the extender(s) 124 include one or more articulating arms. As another example, the extender(s) 124 include a piston moveably coupled to a housing. As another example, the extender(s) 124 include one or more telescoping segments. As another example, the extender(s) 124 include one or more scissor-type segments. As another example, the extender(s) 124 include one or more flexible expanding devices. As another example, the extender(s) 124 include one or more according-type sections.

As a further example, the pivot member 126 includes a pin rotatably coupled to a bearing. As another example, the pivot member 126 includes a spherical bearing. As another example, the pivot member 126 includes a ball bearing.

During normal operation of the aircraft 100, the fasteners 109 securely fix the leading edge 104 to the main body 108. When the fasteners 109 secure the leading edge 104 to the main body 108, the support system 120 is restrained from movement.

During a maintenance operation, the fasteners 109 are removed, so that the leading edge 104 is no longer securely fixed to the main body 108. Because the leading edge 104 is no longer securely fixed to the main body 108, the support system 120 can be moved between a retracted position, in which the leading edge 104 abuts the main body 108, and a forward extended position, in which the extender(s) 124 extend the leading edge 104 forwardly apart from the main body 108, while still coupling the leading edge 104 to the main body 108. When the support system 120 is in the forward extended position, internal portions of the main body 108 and the leading edge 104 are exposed, thereby allowing for efficient maintenance of internal components, such as a fuel tank, anti-ice devices (such as heaters), structural features (such as spars, ribs, stringers, etc.), actuators for control surfaces, and/or the like.

As a further example, the support system 120 can be further moved into an upward pivoted position via the pivot member 126, which upwardly pivots the leading edge 104. The upward pivoted position allows for easier access into the main body 108 and the leading edge 104, while ensuring the leading edge 104 remains coupled to the main body 108. As another example, the support system 120 can be moved into a downward pivoted position via the pivot member 126.

The support system 120 ensures that the leading edge 104 remains coupled to (for example, connected to, and not removed from) the main body 108 during a maintenance operation. When the support system 120 is in the forward extended position and the upward (or optionally downward) pivoted position, the support system 120 securely retains the leading edge to the main body 108. The leading edge 104 is not removed from the main body 108 during the maintenance operation, thereby reducing time and labor costs of the maintenance operation. Further, because the leading edge 104 remains coupled to the main body 108 during the maintenance operation, there is no need for additional support equipment, such as a crane, which would otherwise be used to remove and support the leading edge 104 during the maintenance operation. As such, the support system 120 further reduces costs due to there being no need for additional equipment.

After the maintenance operation is completed, the leading edge 104 is moved from the pivoted position to the forward extended position, and then back to the retracted position. In the retracted position, the leading edge 104 abuts the main body 108, and the fasteners 109 are then used to securely fastener the leading edge 104 to the main body 108, which prevents the support system 120 from moving from the retracted position.

As described herein, the support system 120 is configured to couple the leading edge 104 of the wing 102 to the main body 108 of the wing 102. The support system 120 includes the extender 124 configured to secure to the leading edge 104 and the main body 108. The extender 124 is configured to extend and retract. The support system 120 is in a retracted position when the extender 124 is retracted, and a forward extended position when the extender 124 is extended. The leading edge 104 abuts the main body 108 when the support system 120 is in the retracted position. The leading edge 104 is spaced apart from the main body 108 (and connected to the support system 120 via the extender 124) when the support system is in the forward extended position. In at least one example, the extender 124 includes the pivot member 126 configured to move the support system 120 into an upward (or downward) pivoted position. The support system in the upward pivoted position pivotally supports the leading edge 104 in relation to the main body 108.

The fasteners 109 securely fix the leading edge 104 to the main body 108, and prevent the support system 120 from moving from the retracted position to the forward extended position. The fasteners 109 are configured to be removed to allow the support system 120 to be moved from the retracted position to the forward extended position.

Figure 2:
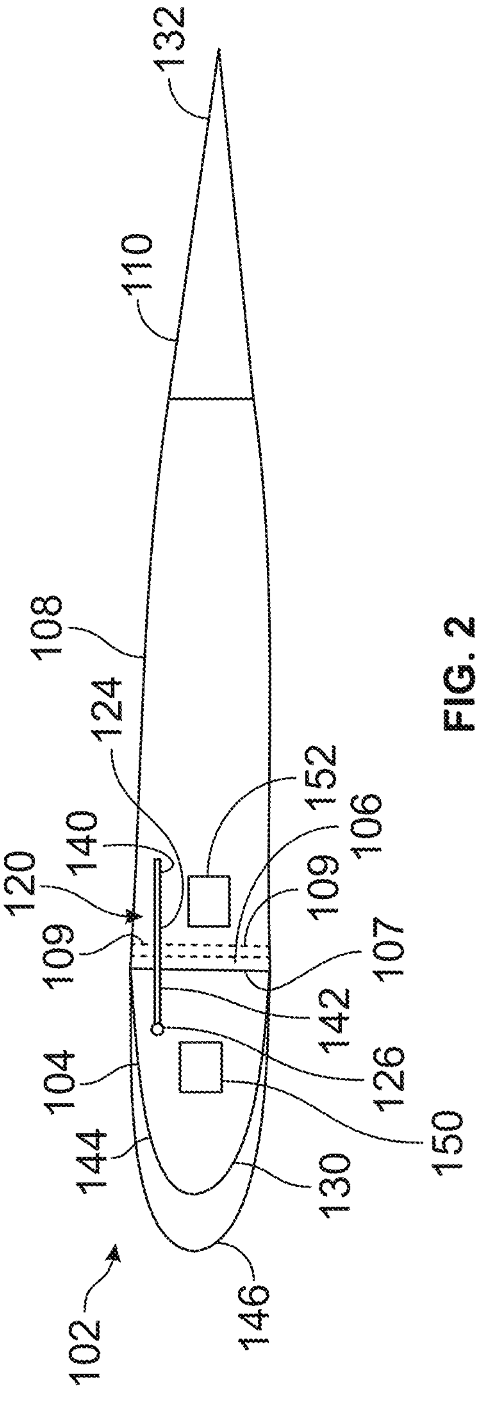
FIG. 2 illustrates a simplified internal view of a wing, according to an example of the present disclosure.

FIG. 2 illustrates a simplified internal view of the wing 102, according to an example of the present disclosure. The wing 102 has an airfoil shape, with the leading edge 104 providing an expanded outwardly bowed front 130, and the trailing edge 110 providing a tapered rear 132.

The support system 120 extends between internal portions of the main body 108 and the leading edge 104. The extender 124 includes a rear section 140 secured to one or more internal structures (such as one or more spar(s), rib(s), and/or stringer(s)) of the main body 108, and a front section 142 including the pivot member 126, secured to one or more internal structures (such as one or more spar(s), rib(s), and/or stinger(s)) of the leading edge 104.

When the fasteners 109 that secure the leading edge 104 to the main body 108 are removed, the support system 120 is moveable between the retracted position 144, in which the leading edge 104 abuts against the main body 108, and a forward extended position 146, in which the extender(s) 124 are forwardly extended to forwardly move the leading edge 104 away from the main body 108. In the forward extended position 146, a gap is created between the front end 106 of the main body 108, and a rear end 107 of the leading edge 104, thereby exposing internal portions of the main body 108 and the leading edge 104.

The leading edge 104 and/or the main body 108 includes a component 150 and/or 152, which can be readily accessed, removed, and/or replaced when the support system 120 is in the forward extended position. In at least one example, the pivot member 126 allows the support system 120 to further move into an upward (or downward) pivoted position, thereby allowing the leading edge 104 to be upwardly pivoted in relation to the main body 108, to provide increased ease of access to internal portions of the main body 108 and the leading edge 104. Optionally, the support system 120 may not include the pivot member, and the support system 120 may not be further configured to move into the upward pivoted position.

Figure 3:
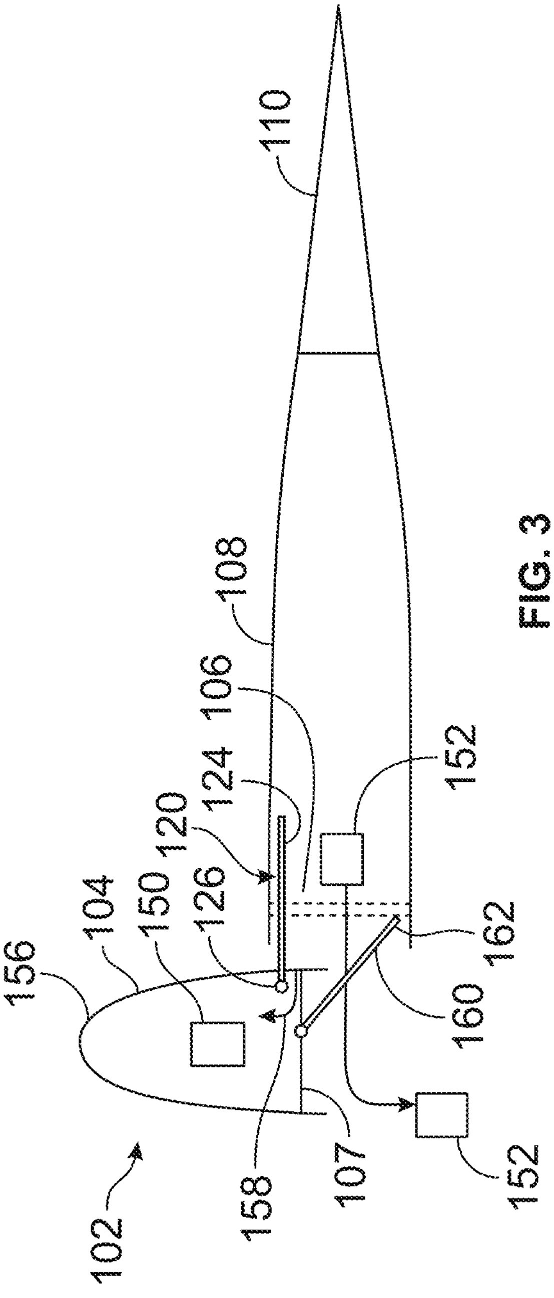
FIG. 3 illustrates a simplified internal view of the wing having the support system in an upward pivoted position, according to an example of the present disclosure.

FIG. 3 illustrates a simplified internal view of the wing 102 having the support system 120 in an upward pivoted position 156, according to an example of the present disclosure. In order to move the wing 102 into the upward pivoted position 156, the support system 120 is first moved into the forward extended position 146 (shown in FIG. 2), such as by the extender 124 being forwardly extended. Then, the leading edge 104 is engaged to upwardly pivot about a pivot axis of the pivot member 126 in the direction of arc 158.

In at least one example, the support system 120 also includes a strut 160, such as a beam or panel, pivotally coupled to the leading edge 104. The strut 160 is pivotally coupled to the rear end 107 of the leading edge 104, and includes a free end 162 which is used to lock into a reciprocal retainer within the front end 106 of the main body 108 to securely prop and support the leading edge 104 in an upwardly pivoted orientation. Optionally, the strut 160 can pivotally couple to the front end 106 of the main body 108, and have a free end that is used to lock into a reciprocal retainer of the rear end 107 of the leading edge 104. As another example, the strut 160 can have a first end pivotally and slidably coupled to a first track of the leading edge 104, and a second end pivotally and slidably coupled to a second track of the main body 108. Alternatively, the support system 120 may not include the strut.

Figure 4:
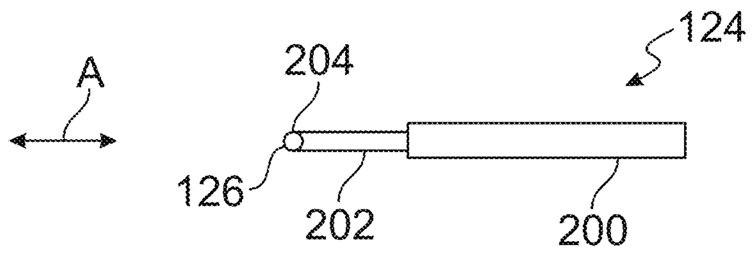
FIG. 4 illustrates a simplified view of an extender, according to an example of the present disclosure.

FIG. 4 illustrates a simplified view of an extender 124, according to an example of the present disclosure. Referring to FIGS. 1-4, the extender 124 includes a fixed rail 200, which is fixedly secured to the main body 108 (such as through one or more fasteners, adhesives, and/or the like), and an extension rail 202 slidably secured to the fixed rail 200. The extension rail 202 includes an end 204 secured to the leading edge 104 (such as through one or more fasteners, adhesives, and/or the like). The end 204 includes the pivot member 126, which allows pivotal motion of the leading edge 104. Optionally, the end 204 may not include the pivot member 126. The extension rail 202 is configured to linearly move in relation to the fixed rail 200 in the directions of arrows A.

Figure 5:
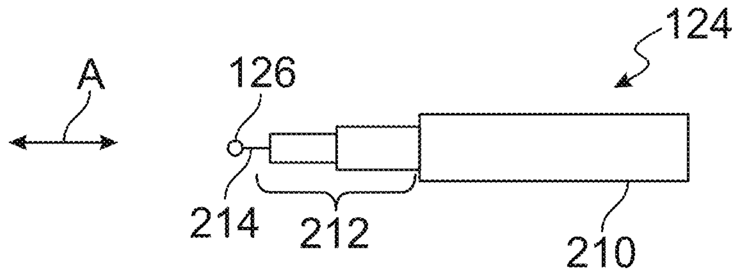
FIG. 5 illustrates a simplified view of an extender, according to an example of the present disclosure.

FIG. 5 illustrates a simplified view of an extender 124, according to an example of the present disclosure. Referring to FIGS. 1-3 and 5, the extender 124 includes a fixed housing 210, which is fixedly secured to the main body 108, and one or more telescoping segments 212 moveably coupled to the fixed housing 210, and configured to telescope inwardly and outwardly in the directions of arrows A. A distal segment 214 is secured to the leading edge 104, and can include the pivot member 126.

Figure 6:
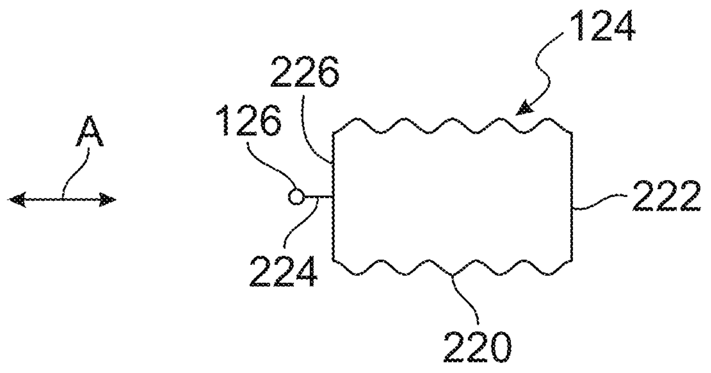
FIG. 6 illustrates a simplified view of an extender, according to an example of the present disclosure.

FIG. 6 illustrates a simplified view of an extender 124, according to an example of the present disclosure. Referring to FIGS. 1-3 and 6, the extender 124 includes an expansion member 220 (such as an expandable/collapsible elastomeric bag or membrane) having an end 222 fixedly secured to the main body 108, and a coupling protuberance 224 outwardly extending from an opposite end 226 of the expansion member 220. The opposite end 226 is secured to the leading edge 104, and can include the pivot member 126. The expansion member 220 is configured to extend and retract in the directions of arrows A.

FIGS. 4-6 show examples of the extender 124. The extender 124 can include various other mechanisms for extending, such as articulating arms, scissor-type mechanism, and/or the like.

Figure 7:
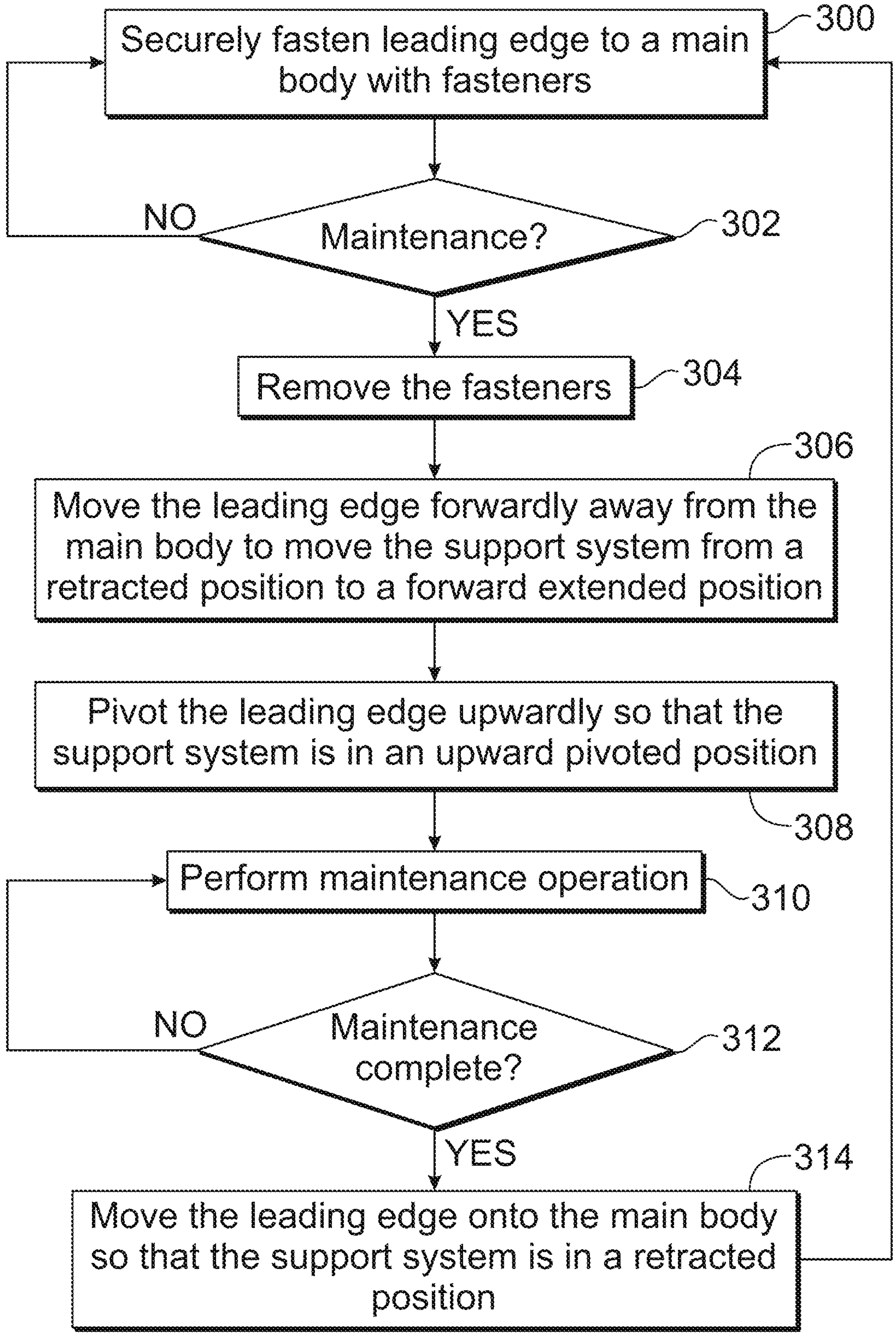
FIG. 7 illustrates a flow chart of a method, according to an example of the present disclosure.

FIG. 7 illustrates a flow chart of a method, according to an example of the present disclosure. Referring to FIGS. 1-7, at 300, the leading edge 104 is securely fastened to the main body 108 of the wing 102 with fasteners 109. At 302, it is determined if maintenance for internal components of the wing 102 is needed. If not, the method returns to 300, at which the leading edge 104 is securely fastened to the main body 108 by the fasteners 109.

If, however, maintenance is needed at 302, the method proceeds to 304, at which the fasteners 109 are removed, thereby allowing for movement of the leading edge 104 away from the main body 108. At 306, the leading edge 104 is then moved forwardly away from the main body 108 to move the support system 120 from the retracted position 144 to the forward extended position 146. At 308, the leading edge 104 can then be pivoted upwardly so that the support system 120 is in an upward pivoted position 156. Alternatively, the method may not include 308.

At 310, one or more maintenance operations (for example, repairing or replacing components 150 and/or 152) are performed. At 312, it is determined if maintenance is complete. If not, the method returns to 310. If maintenance is complete at 312, the method proceeds to 314, at which the leading edge 104 is moved onto the main body 108 so that the support system 120 is back in the retracted position 144, and the method then returns to 300, at which the leading edge 104 is securely fastened to the main body 108 with the fasteners 109.

Figure 8:
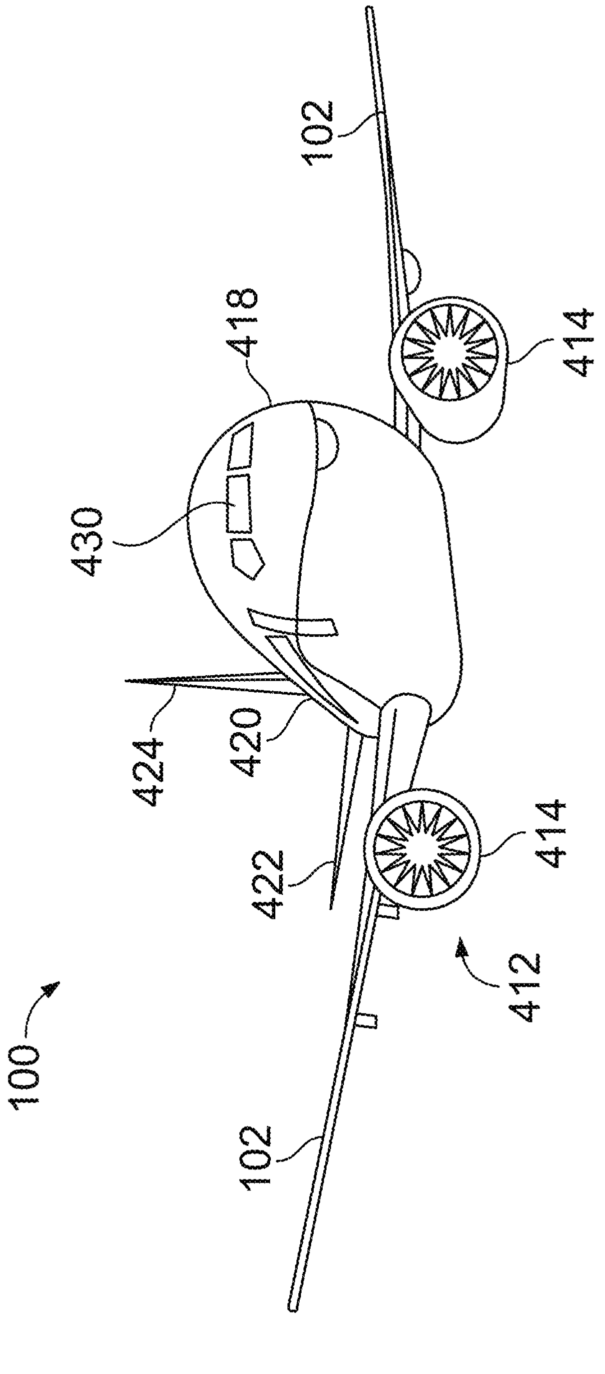
FIG. 8 illustrates a perspective front view of an aircraft, according to an example of the present disclosure.

FIG. 8 illustrates a perspective front view of an aircraft 100, according to an example of the present disclosure. The aircraft 100 includes a propulsion system 412 that includes engines 414, for example. Optionally, the propulsion system 412 may include more engines 414 than shown. The engines 414 are carried by wings 102 of the aircraft 100. In other examples, the engines 414 may be carried by a fuselage 418 and/or an empennage 420. The empennage 420 may also support horizontal stabilizers 422 and a vertical stabilizer 424. The fuselage 418 of the aircraft 100 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like.

FIG. 8 shows an example of an aircraft 100. It is to be understood that the aircraft 100 can be sized, shaped, and configured differently than shown in FIG. 8. The aircraft 100 can be configured to carry passengers, and/or cargo, for example.

Referring to FIGS. 1-8, the support system 120 significantly reduces labor time, costs, and the logistics associated with removing a leading edge of a wing for access during maintenance. Further, because the support system 120 couples the leading edge 104 to the main body 108 when the support system 120 is in the forward extended position 146 and the upward pivoted position 156, the risk of damage to the leading edge 104 is substantially reduced (as compared to a leading edge that is removed and held by separate support equipment in a hangar). The support system 120 reduces the need for separate equipment, and reduces impacts on operational schedules for airlines. Additionally, the support system 120 provides more options for component install design and system routing. Also, the support system 120 reduces a need for access panels behind a leading edge, which also reduces development and production costs, while improving aerodynamics. Further, the support system 120 allows for maintenance to be performed from and/or near ground level, as opposed to on top of the wing.

Further, the disclosure comprises examples according to the following clauses:

Clause 1. A support system configured to couple a leading edge of a wing to a main body of the wing, the support system comprising:

an extender configured to secure to the leading edge and the main body, wherein the extender is configured to extend and retract, wherein the support system is in a retracted position when the extender is retracted, wherein the support system is in a forward extended position when the extender is extended, wherein the leading edge abuts the main body when the support system is in the retracted position, and wherein the leading edge is spaced apart from the main body when the support system is in the forward extended position.

Clause 2. The support system of Clause 1, wherein the extender comprises a pivot member configured to move the support system into an upward pivoted position, and wherein the support system in the upward pivoted position pivotally supports the leading edge in relation to the main body.

Clause 3. The support system of Clause 2, further comprising a strut configured to support the leading edge when the support system is in the upward pivoted position.

Clause 4. The support system of Clause 3, wherein the strut is moveably coupled to one or both of the leading edge or the main body.

Clause 5. The support system of any of Clauses 1-4, wherein fasteners securely fix the leading edge to the main body, wherein the fasteners prevent the support system from moving from the retracted position to the forward extended position, and wherein the fasteners are configured to be removed to allow the support system to be moved from the retracted position to the forward extended position.

Clause 6. The support system of any of Clauses 1-5, wherein the extender is configured to be secured within the main body and the leading edge when the support system is in the retracted position.

Clause 7. The support system of any of Clauses 1-6, wherein the extender comprises:

a fixed rail configured to be secured to the main body; and an extension rail slidably secured to the fixed rail, wherein the extension rail is configured to be secured to the leading edge.

Clause 8. The support system of any of Clauses 1-7, wherein the extender comprises telescoping segments.

Clause 9. An aircraft comprising:

a wing having a leading edge and a main body; and a support system coupling the leading edge to the main body, the support system comprising:

an extender configured secured to the leading edge and the main body, wherein the extender is configured to extend and retract, wherein the support system is in a retracted position when the extender is retracted, wherein the support system is in a forward extended position when the extender is extended, wherein the leading edge abuts the main body when the support system is in the retracted position, and wherein the leading edge is spaced apart from the main body when the support system is in the forward extended position.

Clause 10. The aircraft of Clause 9, wherein the extender comprises a pivot member configured to move the support system into an upward pivoted position, and wherein the support system in the upward pivoted position pivotally supports the leading edge in relation to the main body.

Clause 11. The aircraft of Clause 10, wherein the support system further comprises a strut configured to support the leading edge when the support system is in the upward pivoted position.

Clause 12. The aircraft of Clause 11, wherein the strut is moveably coupled to one or both of the leading edge or the main body.

Clause 13. The aircraft of any of Clauses 9-12, further comprising fasteners that securely fix the leading edge to the main body, wherein the fasteners prevent the support system from moving from the retracted position to the forward extended position, and wherein the fasteners are configured to be removed to allow the support system to be moved from the retracted position to the forward extended position.

Clause 14. The aircraft of any of Clauses 9-13, wherein the extender is secured within the main body and the leading edge when the support system is in the retracted position.

Clause 15. The aircraft of any of Clauses 9-14, wherein the extender comprises:

a fixed rail configured to be secured to the main body; and an extension rail slidably secured to the fixed rail, wherein the extension rail is configured to be secured to the leading edge.

Clause 16. The aircraft of any of Clauses 9-15, wherein the extender comprises telescoping segments.

Clause 17. A method for a support system that couples a leading edge of a wing to a main body of the wing, the support system comprising:

an extender configured to secure to the leading edge and the main body, wherein the extender is configured to extend and retract, wherein the support system is in a retracted position when the extender is retracted, wherein the support system is in a forward extended position when the extender is extended, wherein the leading edge abuts the main body when the support system is in the retracted position, and wherein the leading edge is spaced apart from the main body when the support system is in the forward extended position, the method comprising:

retracting the extender to move the support system into the retracted position so that the leading edge abuts the main body;

extending the extender to move the support system into the forward extended position so that the leading edge is spaced apart from the main body.

Clause 18. The method of Clause 17, wherein the extender comprises a pivot member configured to move the support system into an upward pivoted position, and wherein the method further comprises moving the support system into the upward pivoted position to pivotally support the leading edge in relation to the main body.

Clause 19. The method of Clause 18, further comprising supporting, by a strut, the leading edge when the support system is in the upward pivoted position.

Clause 20. The method of any of Clauses 17-19, further comprising:

using fasteners to securely fix the leading edge to the main body when the support system is in the retracted position, wherein the fasteners prevent the support system from moving from the retracted position to the forward extended position; and removing the fasteners to allow the support system to be moved from the retracted position to the forward extended position.

As described herein, examples of the present disclosure provide an efficient and effective system and method for supporting a leading edge of a wing of an aircraft during a maintenance operation.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:

a wing including a leading edge and a main body, wherein fasteners securely fix the leading edge of the wing to the main body of the wing; and a support system coupling the configured to couple a leading edge of the wing to the main body of the wing, the support system comprising:

an extender configured to secure to the leading edge and the main body, wherein the extender is configured to extend and retract, wherein the support system is in a retracted position when the extender is retracted, wherein the support system is in a forward extended position when the extender is extended, wherein the leading edge abuts the main body when the support system is in the retracted position, wherein the leading edge is spaced apart from the main body when the support system is in the forward extended position, wherein the fasteners prevent the support system from moving from the retracted position to the forward extended position, and wherein the fasteners are removable to allow the support system to be moved from the retracted position to the forward extended position.

2. The system of claim 1, wherein the extender comprises a pivot member configured to move the support system into an upward pivoted position, and wherein the support system in the upward pivoted position pivotally supports the leading edge in relation to the main body.

3. The system of claim 2, further comprising a strut configured to support the leading edge when the support system is in the upward pivoted position.

4. The system of claim 3, wherein the strut is moveably coupled to one or both of the leading edge or the main body.

5. The system of claim 2, wherein the wherein the pivot member moves the support system into the upward pivoted position to provide direct exposed access to internal areas of the leading edge and the main body of the wing.

6. The system of claim 1, wherein the extender is configured to be secured within the main body and the leading edge when the support system is in the retracted position.

7. The system of claim 1, wherein the extender comprises:
a fixed rail configured to be secured to the main body; and
an extension rail slidably secured to the fixed rail, wherein the extension rail is configured to be secured to the leading edge.

8. The system of claim 1, wherein the extender comprises telescoping segments.

9. The system of claim 1, wherein the extender comprises a pivot member which moves the support system into an upward pivoted position,
wherein the extender is secured within the main body and the leading edge when the support system is in the retracted position,
wherein the extender comprises a fixed rail secured to the main body, and an extension rail slidably secured to the fixed rail,
wherein the extension rail is configured to be secured to the leading edge,
wherein the support system in the upward pivoted position pivotally supports the leading edge in relation to the main body,
wherein the system further comprises a strut which supports the leading edge when the support system is in the upward pivoted position, and
wherein the strut is moveably coupled to one or both of the leading edge or the main body.

10. An aircraft comprising:
a wing having a leading edge and a main body, wherein fasteners securely fix the leading edge to the main body; and
a support system coupling the leading edge to the main body, the support system comprising:
an extender configured secured to the leading edge and the main body, wherein the extender is configured to extend and retract,
wherein the support system is in a retracted position when the extender is retracted,
wherein the support system is in a forward extended position when the extender is extended,
wherein the leading edge abuts the main body when the support system is in the retracted position,
wherein the leading edge is spaced apart from the main body when the support system is in the forward extended position,
wherein the fasteners prevent the support system from moving from the retracted position to the forward extended position, and
wherein the fasteners are removed to allow the support system to be moved from the retracted position to the forward extended position.

11. The aircraft of claim 10, wherein the extender comprises a pivot member configured to move the support system into an upward pivoted position, and wherein the support system in the upward pivoted position pivotally supports the leading edge in relation to the main body.

12. The aircraft of claim 11, wherein the support system further comprises a strut configured to support the leading edge when the support system is in the upward pivoted position.

13. The aircraft of claim 12, wherein the strut is moveably coupled to one or both of the leading edge or the main body.

14. The aircraft of claim 10, wherein the extender is secured within the main body and the leading edge when the support system is in the retracted position.

15. The aircraft of claim 10, wherein the extender comprises:
a fixed rail configured to be secured to the main body; and
an extension rail slidably secured to the fixed rail, wherein the extension rail is configured to be secured to the leading edge.

16. The aircraft of claim 10, wherein the extender comprises telescoping segments.

17. A method for a support system that couples a leading edge of a wing to a main body of the wing, the support system comprising:
an extender secured to the leading edge and the main body, wherein the extender is configured to extend and retract,
wherein the support system is in a retracted position when the extender is retracted,
wherein the support system is in a forward extended position when the extender is extended,
wherein the leading edge abuts the main body when the support system is in the retracted position, and
wherein the leading edge is spaced apart from the main body when the support system is in the forward extended position,
the method comprising:
using fasteners to securely fix the leading edge to the main body of the wing when the support system is in the retracted position, wherein the fasteners prevent the support system from moving from the retracted position to the forward extended position;
removing the fasteners to allow the support system to be moved from the retracted position to the forward extended position;
retracting the extender to move the support system into the retracted position so that the leading edge abuts the main body; and
extending the extender to move the support system into the forward extended position so that the leading edge is spaced apart from the main body.

18. The method of claim 17, wherein the extender comprises a pivot member configured to move the support system into an upward pivoted position, and wherein the method further comprises moving the support system into the upward pivoted position to pivotally support the leading edge in relation to the main body.

19. The method of claim 18, further comprising supporting, by a strut, the leading edge when the support system is in the upward pivoted position.

20. The method of claim 18, wherein said moving the support system into the upward pivoted position provides direct exposed access to internal areas of the leading edge and the main body of the wing.

* * * * *